United States Patent
Chida et al.

(10) Patent No.: US 9,432,188 B2
(45) Date of Patent: Aug. 30, 2016

(54) SECRET SHARING SYSTEM, DATA DISTRIBUTION APPARATUS, DISTRIBUTED DATA TRANSFORM APPARATUS, SECRET SHARING METHOD AND PROGRAM

(71) Applicant: NIPPON TELEGRAPH AND TELEPHONE CORPORATION, Tokyo (JP)

(72) Inventors: Koji Chida, Tokyo (JP); Dai Ikarashi, Tokyo (JP); Koki Hamada, Tokyo (JP); Ryo Kikuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/408,426

(22) PCT Filed: Jul. 4, 2013

(86) PCT No.: PCT/JP2013/068328
§ 371 (c)(1),
(2) Date: Dec. 16, 2014

(87) PCT Pub. No.: WO2014/007310
PCT Pub. Date: Jan. 9, 2014

(65) Prior Publication Data
US 2015/0172049 A1    Jun. 18, 2015

(30) Foreign Application Priority Data
Jul. 5, 2012 (JP) ................................. 2012-151140

(51) Int. Cl.
*H04L 29/06* (2006.01)
*G06F 21/00* (2013.01)
(Continued)

(52) U.S. Cl.
CPC ........... *H04L 9/0869* (2013.01); *G06F 21/606* (2013.01); *G06F 21/62* (2013.01); *H04L 9/008* (2013.01); *H04L 9/085* (2013.01); *H04L 2209/24* (2013.01)

(58) Field of Classification Search
CPC ....... H04L 9/0869; H04L 9/08; H04L 9/085; H04L 9/008; H04L 2209/24; G06F 21/62; G06F 21/606
See application file for complete search history.

(56) References Cited

U.S. PATENT DOCUMENTS

2004/0179686 A1 * 9/2004 Matsumura ............. H04L 9/085
                                                                    380/44
2010/0309003 A1 * 12/2010 Rousseau ................. G07C 1/10
                                                                    340/573.4

FOREIGN PATENT DOCUMENTS

| JP | 2004 279526 | 10/2004 |
|----|-------------|---------|
| JP | 2007 124610 | 5/2007  |

OTHER PUBLICATIONS

Chida, K. et al., "A Short Computational Secret Sharing Scheme Applicable to A Multiparty Computation", SCIS 2012, pp. 1-6, (Jan. 30, 2012), with English abstract and partial translation.
(Continued)

*Primary Examiner* — Lisa Lewis
(74) *Attorney, Agent, or Firm* — Oblon, McClelland, Maier & Neustadt, L.L.P.

(57) ABSTRACT

A secret sharing system transforms computational secret shares to homomorphic secret shares. On a data distribution apparatus, a key selector selects K'−1 keys. A pseudorandom number generator generates pseudorandom numbers from the keys. An encryption part generates a ciphertext from information using the pseudorandom numbers. A key division part divides the keys into N shares $f_g(n)$ using an arbitrary sharing. A ciphertext division part divides the ciphertext into N shares $f_c(n)$ using an arbitrary sharing. When K shares $f_{sj}(i)$ are input into distributed data transform apparatuses, a reconstruction part generates a reconstructed value $U_j$ by reconstructing shares $f_{sj}(i)$ using the secret sharing, and when K shares $f_c(i)$ are input, generates the reconstructed value $U_j$ by reconstructing shares $f_c(i)$ using the arbitrary sharing. A redivision part divides reconstructed value $U_j$ into N shares $f_{Uj}(n)$ using a homomorphic secret sharing. A transformer generates share $g_a(i)$ of the information from K' shares $f_{Uj}$.

16 Claims, 10 Drawing Sheets

(51) Int. Cl.
*H04L 9/08* (2006.01)
*H04L 9/00* (2006.01)
*G06F 21/60* (2013.01)
*G06F 21/62* (2013.01)

(56) References Cited

OTHER PUBLICATIONS

Chida, K. et al., "Efficient Conversions from Computational SSS And Ramp SSS to Multi-Party Computation", IEICE Technical Report, vol. 112, No. 126, pp. 267-271, (Jul. 12, 2012).
Shamir, A., "How to Share a Secret", Communications of the ACM, vol. 22, No. 11, pp. 612-613, (Nov. 1979).
Krawczyk, H., "Secret Sharing Made Short", CRYPTO, pp. 136-146, (1993).
Ben-Or, M. et al., "Complete Theorems for Non-Cryptographic Fault-Tolerant Distributed Computation (Extended Abstract)", STOC, pp. 1-10, (1988).
Cramer, R. et al., "General Secure Multi-party Computation from any Linear Secret-Sharing Scheme", Eurocrypto, pp. 316-334, (2000).
International Search Report Issued Aug. 6, 2013 in PCT/JP13/068328 Filed Jul. 4, 2013.
Office Action issued Oct. 6, 2015 in Japanese Patent Application No. 2014-523777 (with English language translation).
Extended European Search Report mailed Apr. 6, 2016, in EP Patent Application No. 13813379.8.
Keller et al., "Efficient Threshold Zero-Knowledge with Applications to User-Centric Protocols," International Association for Cryptologic Research, vol. 20120603:213734, May 31, 2012, pp. 1-27.

\* cited by examiner

SECRET SHARING SYSTEM, DATA DISTRIBUTION APPARATUS, DISTRIBUTED DATA TRANSFORM APPARATUS, SECRET SHARING METHOD AND PROGRAM

TECHNICAL FIELD

The present invention relates to a computational secret sharing technique and a multiparty computation technique.

BACKGROUND ART

Secret sharing is a technique by which data is transformed into multiple shares so that the original data can be reconstructed by using a certain number of shares or more but none of the original data can be reconstructed by using any number of shares less than the certain number. Some secret sharing schemes impose restrictions on the total number N of shares and the smallest number K ($\leq$N) of shares required for reconstruction and others not.

A typical secret sharing scheme is Shamir's secret sharing scheme (see Non-patent literature 1, for example). In an example of this scheme, shares $S_i(a)=f(i)$ (i=1, ..., N) of a is obtained from a K−1-degree expression $f(x)$, where x is a variable, such that $f(0)=a$ for $a \in GF(p)$, where p is a prime, and $GF(p)$ is a finite field of order p. Here, a can be reconstructed from any K different shares because the following relationship holds:

$$a = f(0) = \sum_{i=1}^{K} f(n_i) \cdot L_i(0) \qquad \text{[Formula 1]}$$

$$L_i(x) = \prod_{j \neq i, j=1}^{K} \frac{x - n_j}{n_i - n_j}$$

where $n_1, \ldots, n_K$ are different integers greater than or equal to 1 and less than or equal to N.

One type of secret sharing is a computational secret sharing scheme in which, based on computational safety, no part of original data can be reconstructed from any number of shares less than a certain value (see Non-patent literature 2, for example). In an example of this scheme, information $a=(a_0, a_1, \ldots, a_{K-1})$ ($a_0, a_1, \ldots, a_{K-1} \in GF(p)$) is encrypted using a common encryption key and shares $T_i(c)=f(i)$ (i=1, ..., N) of c is obtained from a K−1-degree expression $f(x)=c_0+c_1 x + \ldots + c_{K-1} x^{K-1}$, where x is an variable, determined by the ciphertext $c=(c_0, c_1, \ldots, c_{K-1})$ (where $c_0, c_1, \ldots, c_{K-1} \in GF(p)$). The common key is divided separately using a secret sharing scheme such as Shamir's secret sharing scheme. Then, the coefficients $c_0, c_1, \ldots, c_{K-1}$ of the expression $f(x)$ can be uniquely obtained from K points $(n_i, f(n_i))$ (i=1, ..., K) of the expression $f(x)$, where $n_1, \ldots, n_K$ are different integers greater than or equal to 1 and less than or equal to N. Solutions to $c_0, c_1, \ldots, c_{K-1}$ can be obtained for the following matrix where $c_0, c_1, \ldots, c_{K-1}$ are variables:

$$\begin{pmatrix} f(n_1) \\ \vdots \\ f(n_K) \end{pmatrix} = \begin{pmatrix} n_1^0 & \cdots & n_1^{K-1} \\ \vdots & \ddots & \vdots \\ n_K^0 & \cdots & n_K^{K-1} \end{pmatrix} \begin{pmatrix} c_0 \\ \vdots \\ c_{K-1} \end{pmatrix}. \qquad \text{[Formula 2]}$$

By reconstructing the common key and decrypting c, a can be obtained.

On the other hand, a multiparty computation scheme, which uses secret sharing as an elemental technology, has been proposed. The multiparty computation is a technique in which each computing entity i (i=1, ..., N) takes an input of information $a_i$ and obtains a particular function value $F_i(a_1, \ldots, a_N)$ without revealing the information $a_i$ to the other computing entities. In Shamir's secret sharing scheme described above, shares $S_i(a+b)$ of a+b and shares $S_i(ab)$ of ab can be obtained from shares $S_i(a)$, $S_i(b)$ of information a, $b \in GF(p)$ without revealing inputs into the computing entities (see Non-patent literature 3). That is, multiparty computations of addition and multiplication are possible using Shamir's secret sharing scheme. Note that secret sharing that satisfies the relationship $S_i(a)+S_i(b)=s_i(a+b)$ is called additive homomorphic secret sharing.

Another type of secret sharing is linear secret sharing schemes. The linear secret schemes can be defined as secret sharing in which all of the shares of original data $a \in GF(p)$ can be represented by $a \in GF(p)$ and a linear combination of random numbers on GF(p). It is known that any linear secret sharing scheme can be extended to multiparty computation (see Non-patent literature 4). (see Non-patent literature 4).

PRIOR ART LITERATURE

Non-Patent Literature

Non-patent literature 1: A. Shamir, "How to share a secret", Commun. ACM 22 (11), pp. 612-613, 1979.
Non-patent literature 2: H. Krawczyk, "Secret sharing made short", CRYPTO 1993, pp. 136-146, 1993.
Non-patent literature 3: M. Ben-Or, S. Goldwasser, and A. Wigderson, "Completeness theorems for non-cryptographic fault-tolerant distributed computation (extended abstract)," STOC 1988, pp. 1-10, 1988.
Non-patent literature 4: R. Cramer, I. Damgard and U. Maurer, "General Secure Multi-Party Computation from any Linear Secret-Sharing Scheme", Eurocrypto 2000, pp. 316-334, 2000.

SUMMARY OF THE INVENTION

Problem to be Solved by the Invention

In Shamir's secret sharing scheme, the total data amount of shares is approximately N times the data amount of each piece of information a, given that the data amount of information a and the data amount of each share of the information a are constant. The total data amount of shares required for reconstructing each piece of information a is approximately K times the data amount of the piece of information a. It is desirable to minimize the data amount of shares because an increase in the data amount of shares leads to increases in communication time and the amount of stored data.

In computational secret sharing schemes, generally $T_i(a)+T_i(b) \neq T_i(a+b)$. Accordingly, in computational secret sharing schemes, unlike in Shamir's secret sharing scheme, a method of multiparty computation of addition of inputs are not self-evident. However, the computational secret sharing schemes are advantageous in that the total data amount of shares and the total data amount of shares required for reconstruction are smaller than in those in Shamir's secret sharing scheme.

The present invention has been made in light of these circumstances and an object of the present invention is to provide a secret sharing technique capable of using shares according to a computational secret sharing scheme to perform multiparty computation.

Means to Solve the Problem

To solve the problem, a secret sharing system in one mode of the present invention includes a data distribution apparatus and N distributed data transform apparatuses. In the present invention, N and K are integers greater than or equal to 2. N≥K, n=1, ..., N, λ, represents K different integers greater than or equal to 1 and less than or equal to N, i is an integer, i∈λ, $f_x(n)$ is N shares of x, R is a ring, S is a key-space, and P(x) is a mapping that maps x∈S to the ring R.

The data distribution apparatus in this mode includes a key selecting part, a pseudorandom number generation part, an encryption part, a key division part and a ciphertext division part. The key selecting part selects K−1 keys $s_1, ..., s_{K-1} \in S$. The pseudorandom number generation part computes $r_j=P(s_j)$ (j=1, ..., K−1) from the keys $s_1, ..., s_{K-1}$ to generate pseudorandom numbers $r_1, ..., r_{K-1}$. The encryption part uses the pseudorandom numbers $r_1, ..., r_{K-1}$ to generate a ciphertext c from information a∈R. The key division part divides each of the keys $s_1, ..., s_{K-1}$ into N shares $f_{s1}(n), ..., f_{sK-1}(n)$ by using an arbitrary secret sharing scheme S1. The ciphertext division part divides the ciphertext c into N shares $f_c(n)$ by using an arbitrary secret sharing scheme S0.

Each of the distributed data transform apparatuses in this mode includes a reconstruction part, a redivision part, and a transform part. When K shares $f_{sj}(i)$ are input into the distributed data transform apparatuses, the reconstruction part computes a reconstructed value $U_j=P(u_j)$ from a value $u_j$ generated by reconstruction of shares $f_{sj}(i)$ by using the secret sharing scheme S1 and when K shares $f_c(i)$ are input into the distributed data transform apparatuses, the reconstruction part generates the reconstructed value $U_j$ (j=K) by reconstruction of shares $f_c(i)$ by using the secret sharing scheme S0. The redivision part divides the reconstructed value $U_j$ into N shares $f_{uj}(n)$ by using an arbitrary homomorphic secret sharing scheme S2. The transform part generates a share $g_a(j)$ of information a from K shares $f_{U1}(i), ..., f_{UK}(i)$.

A secret sharing system in another mode of the present invention includes a data distribution apparatus and N distributed data transform apparatuses. In the present invention, N, K and K' are integers greater than or equal to 2 where N≥K, n=1, ..., N, λ represents K different integers greater than or equal to 1 and less than or equal to N, i is an integer, i∈λ, $f_x(n)$ represents N shares of x, R is a ring, S is a key-space, and P(x) is a mapping that maps x∈S to the ring R.

The data distribution apparatus in this mode includes a key selecting part, a pseudorandom number generation part, an encryption part, a key division part, and a ciphertext division part. The key selecting part selects K'−1 keys $s_1, ..., s_{K'-1} \in S$. The pseudorandom number generation part computes $r_j=P(s_j)$ (j=1, ..., K'−1) from the keys $s_1, ..., s_{K'-1}$ to generate pseudorandom numbers $r_1, ..., r_{K'-1}$. The encryption part uses the pseudorandom numbers $r_1, ..., r_{K'-1}$ to generate a ciphertext c from information a∈R. The key division part divides each of the keys $s_1, ..., s_{K'-1}$ into N shares $f_{s1}(n), f_{sK'-1}(n)$ by using an arbitrary secret sharing scheme S1. The ciphertext division part divides the ciphertext c into N shares $f_c(n)$ by using an arbitrary sharing scheme S0.

Each of the distributed data transform apparatuses in this mode includes a reconstruction part, a redivision part, and a transform part. When K shares $f_{sj}(i)$ are input into the distributed data transform apparatuses, the reconstruction part computes a reconstructed value $U_j=P(u_j)$ from a value $u_j$ generated by reconstruction of shares $f_{sj}(i)$ by using the secret sharing scheme S1 and when K shares $f_c(i)$ are input into the distributed data transform apparatuses, the reconstruction part generates the reconstructed value $U_j$ (j=K') by reconstruction of shares $f_c(i)$ by using the secret sharing scheme S0. The redivision part divides the reconstructed value $U_j$ into N shares $f_{uj}(n)$ by using an arbitrary homomorphic secret sharing scheme S2. The transform part generates a share $g_a(j)$ of information a from K' shares $f_{U1}(i), ..., f_{UK'}(i)$.

Effects of the Invention

According to the secret sharing technique of the present invention, shares generated by a computational secret sharing scheme can be transformed into shares in an arbitrary homomorphic secret sharing scheme. For example, many of the existing linear secret sharing schemes such as Shamir's secret sharing scheme are homomorphic secret sharing schemes, and therefore multiparty computation methods using shares according to existing linear secret sharing schemes such as Shamir's secret sharing scheme are known. Therefore, choosing an existing linear secret sharing such as Shamir's secret sharing scheme as a homomorphic secret sharing scheme enables multiparty computation using shares according to a computational secret sharing scheme. Additionally, using a computational secret sharing scheme that is efficient in encoding as a secret sharing scheme S0 for dividing a ciphertext c reduces the size of shares and therefore can reduce the total data amount of shares to store and the total data amount of shares required for reconstruction.

DETAILED DESCRIPTION OF THE EMBODIMENTS

Figure 1:
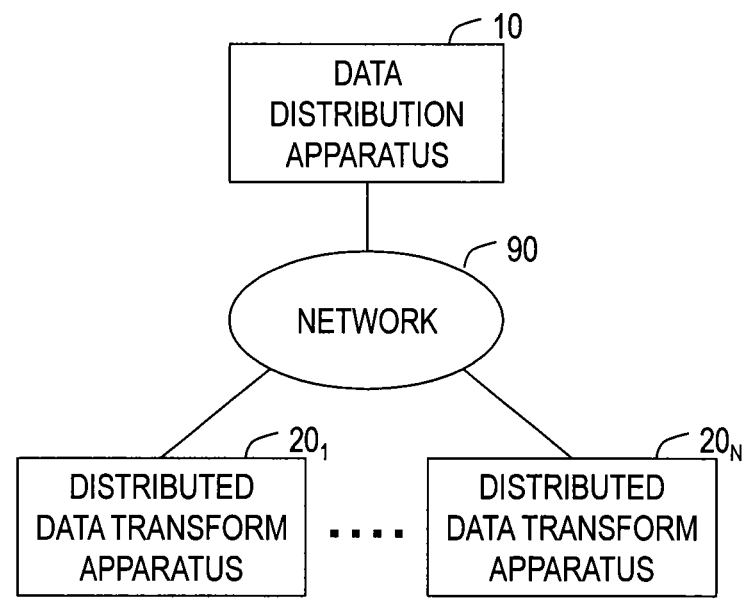
FIG. 1 is a diagram illustrating a functional configuration of a secret sharing system according to a first embodiment.

Embodiments of the present invention will be described below in detail. Components having like functions are given like reference numerals throughout the drawings and repeated description of those components will be omitted.

First Embodiment

A secret sharing system according to a first embodiment of the present invention transforms shares according to a computational secret sharing scheme into shares according to any given homomorphic secret sharing scheme.

<Configuration>

Referring to FIG. 1, an exemplary configuration of a secret sharing system 1 according to the first embodiment will be described. The secret sharing system 1 includes a data distribution apparatus 10, at least N distributed data transform apparatuses $20_1$-$20_N$, and a network 90. The data distribution apparatus 10 and the distributed data transform apparatuses $20_1$-$20_N$ are connected to the network 90. The network 90 only needs to be configured to allow the data distribution apparatus 10 and the distributed data transform apparatuses $20_1$-$20_N$ to communicate with each other and may be, for example, the Internet, a LAN, a WAN or the like. The data distribution apparatus 10 and the distributed data transform apparatuses 201-20N are not necessarily able to communicate online through a network. For example, information output from the data distribution apparatus 10 may be stored on a portable recording medium such as a USB memory and may be input offline from the portable recording medium into the distributed data transform apparatuses $20_1$-$20_N$.

Figure 2:
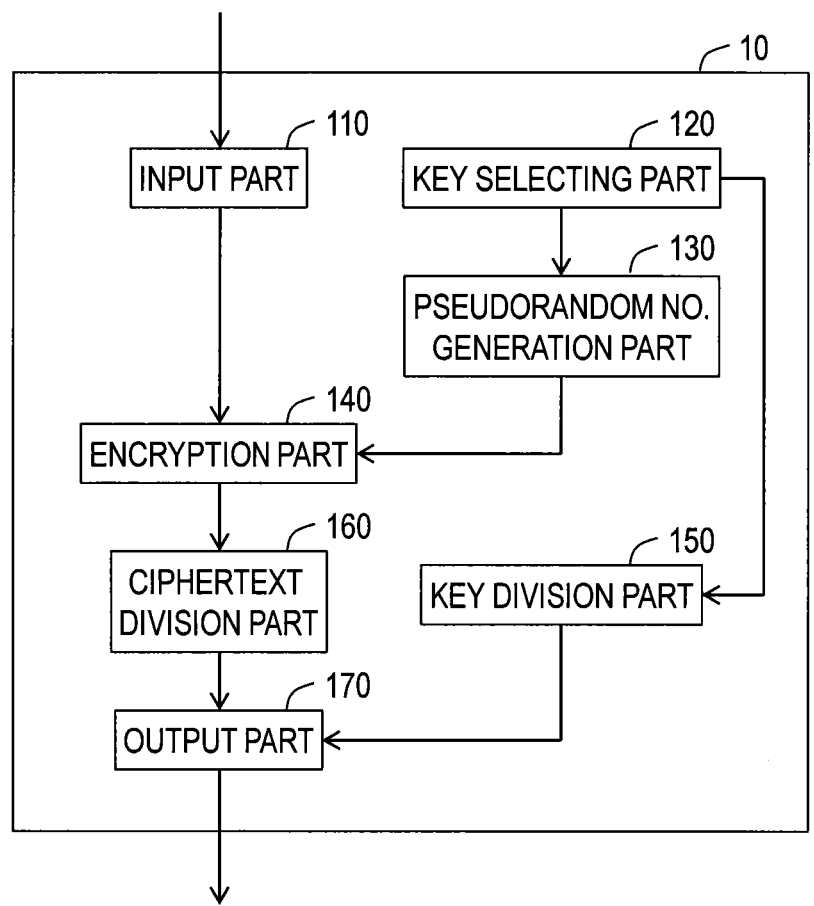
FIG. 2 is a diagram illustrating a functional configuration of a data distribution apparatus according to the first embodiment.

An exemplary configuration of the data distribution apparatus 10 included in the secret sharing system 1 will be described with reference to FIG. 2. The data distribution apparatus 10 includes an input part 110, a key selecting part 120, a pseudorandom number generation part 130, an encryption part 140, a key division part 150, a ciphertext division part 160, and an output part 170.

Figure 3:
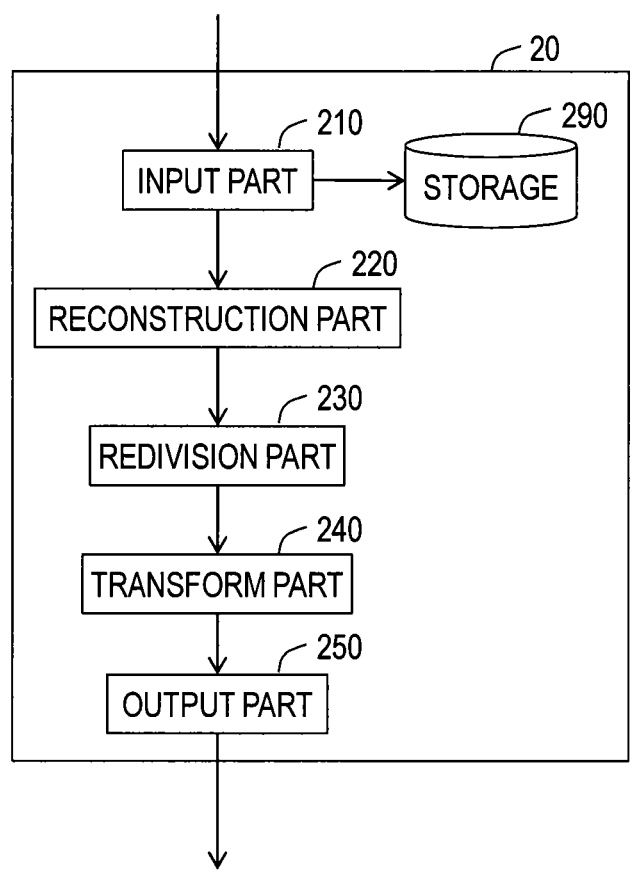
FIG. 3 is a diagram illustrating a functional configuration of a distributed data transform apparatus according to the first embodiment.

An exemplary configuration of a distributed data transform apparatus 20 included in the secret sharing system 1 will be described with reference to FIG. 3. The distributed data transform apparatus 20 includes an input part 210, a reconstruction part 220, a redivision part 230, a transform part 240, an output part 250 and a storage 290. The storage 290 may be a main memory such as a RAM (Random Access Memory), an auxiliary storage device such as a hard disk, an optical disc, or a semiconductor memory device such as a flash memory, or middleware such as a relational database or a key value store.

<Data Distribution Process>

Figure 4:
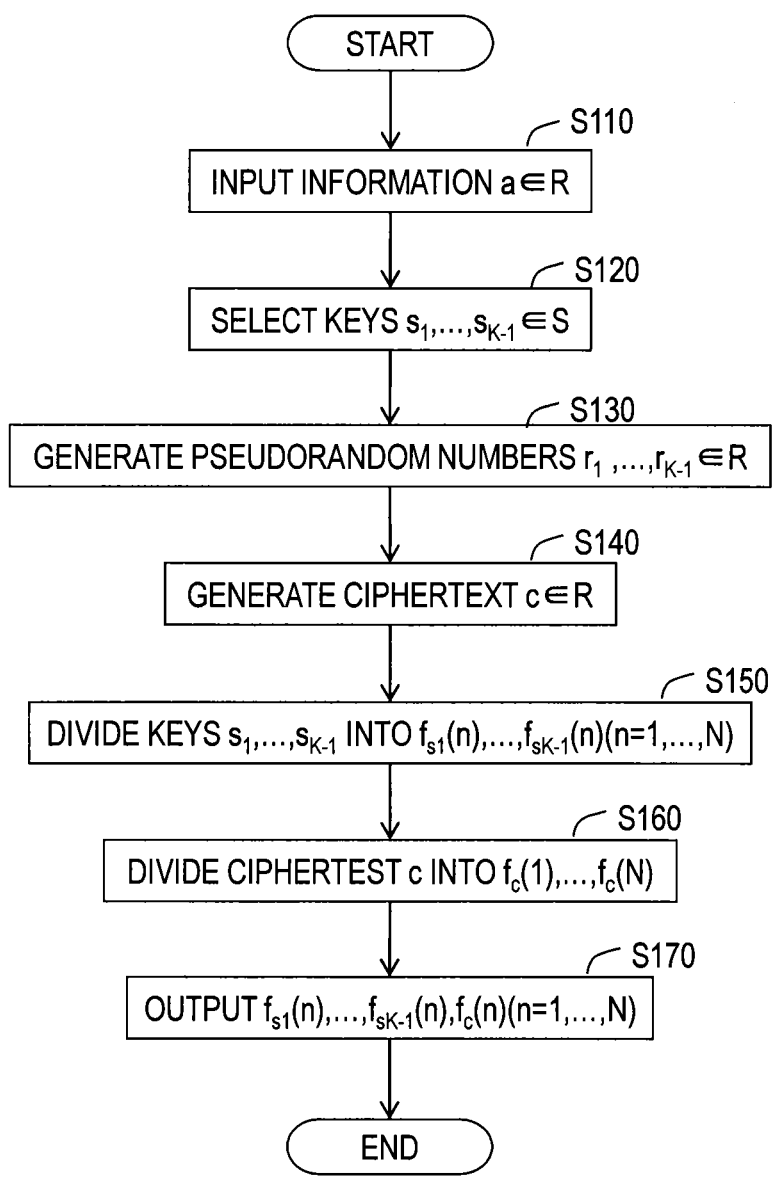
FIG. 4 is a diagram illustrating a process flow in the data distribution apparatus according to the first embodiment.

Referring to FIG. 4, an exemplary operation of the data distribution apparatus 10 will be described in order of procedure actually performed. In the following description, N and K are integers greater than or equal to 2, N≥K, n=1, . . . , N, λ represents K different integers greater than or equal to 1 and less than or equal to N, i is an integer, i∈λ, fx(n) represents N shares of x, R is a ring, S is a key space, P(x) is a mapping that maps x∈S to the ring R. The mapping P(x) outputs the elements of a ring R for input x∈S. The same P(x) corresponds to the same input x. That is, the mapping P(x) is a definite mapping that outputs the same value for the same input. Input x may or may not be in one-to-one correspondence. For example, the mapping P(x) may be a pseudorandom number generator function that uses x as a seed and returns the elements of a ring R. The mapping P(x) may be a common key encryption function that outputs a ciphertext that belongs to the ring R for a fixed plaintext by using x as an encryption key. The mapping P(x) may be a function or an algorithm.

At step S110, information a is input into the input part 110. The information a is values included in the ring R. Accordingly, the information can be expressed as a∈R. Examples of the information a include a video file, an audio file, a text file, and a table file. The data amount of the information a may be greater than or equal to 1 megabytes, for example.

At step S120, the key selecting part 120 selects K−1 keys $s_1, \ldots, s_{K-1} \in S$. The key selecting part 120 may randomly select K−1 keys $s_1, \ldots, s_{K-1}$ one by one or may select K−1 keys $s_1, \ldots, s_{K-1}$ according to a predetermined rule from among a plurality of values generated and stored beforehand in a memory. The keys $S_1, \ldots, s_{K-1}$ are set to a length that can ensure required safety and acceptable throughput. For example, the length is typically set to a length of 128 to 256 bits but is not limited to this range.

Keys $s_1, \ldots, s_{K-1}$ are input into the pseudorandom number generation part 130. At step S130, the pseudorandom number generation part 130 computes $r_j=P(s_j)$ (j=1, . . . , K−1) from the key $s_1, \ldots, s_{K-1}$ to generate pseudorandom numbers $r_1, \ldots, r_{K-1}$.

The information a and the pseudorandom numbers $r_1, \ldots, r_{K-1}$ are input into the encryption part 140. At step S140, the encryption part 140 uses the random numbers $r_1, \ldots, r_{K-1}$ to generate a ciphertext c from the information a. More specifically, the ciphertext c is equal to the information a minus the sum of the pseudorandom numbers $r_1, \ldots, r_{K-1}$ as follows:

$$c = a - \Sigma_{k=1}^{K-1} r_k \qquad \text{[Formula 3]}$$

Keys $s_1, \ldots, s_{K-1}$ are also input into the key distribution part 150. At step S150, the key division part 150 divides each of the keys $s_1, \ldots, s_{K-1}$ into N shares $f_{s1}(n), \ldots, f_{sK-1}(n)$ (n=1, . . . , N) according to an arbitrary secret sharing scheme S1. While the secret sharing scheme S1 may be any secret sharing scheme, it is desirable to use a secure secret sharing scheme because the keys used for decrypting the information a is distributed. For example, Shamir's secret sharing scheme can be used. Shamir's secret sharing scheme is a secure secret sharing scheme because original data can be reconstructed from K or more shares among N shares into which the original data has been divided but no information about the original data can be obtained from fewer than K shares, where N and K are integers greater than or equal to 2 and N≥K.

The ciphertext c is input into the ciphertext division part 160. At step S160, the ciphertext division part 160 divides the ciphertext c into N shares $f_c(n)$ (n=1, . . . , N) according to an arbitrary secret sharing scheme S0. While the secret sharing scheme S0 may be any secret sharing scheme, the scheme described in Non-patent literature 2, for example, may be used. However, when the scheme described in Non-patent literature 2 is used, a value c on the ring R needs to be transformed to a K-dimensional vector on GF(p). This can be achieved, for example, by padding higher-order bits with 0s so that the elements of the ring R have a length of K×L bits, where the bit length of a prime P is L+1 and the bit length of elements of the ring R is less than or equal to K×L, dividing the value c into L-bit values and setting the L-bit values as the elements of GF(p), where each of the L-bit values is an integer greater than or equal to 0 and less than $2^L$.

At step S170, the output part 170 outputs shares $f_{s1}(n), \ldots, f_{sK-1}(n), f_c(n)$ (n=1, ..., N). The output shares $f_{s1}(n), \ldots, f_{sK-1}(n), f_c(n)$ (n=1, ..., N) are input into distributed data transform apparatuses $20_1$-$20_N$, respectively, through the network 90 or a portable recording medium such as a USB memory.

<Distributed Data Transform Process>

Figure 5:
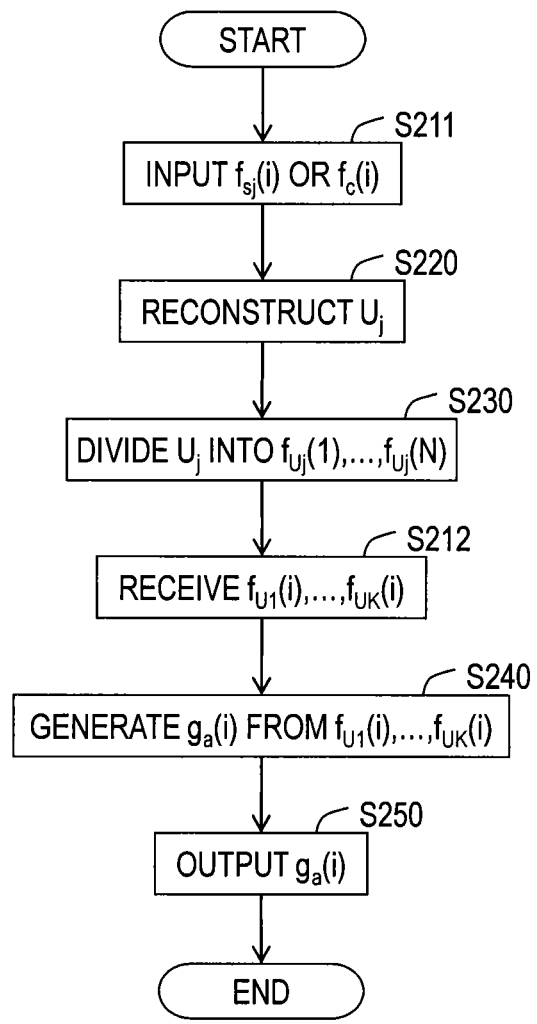
FIG. 5 is a diagram illustrating a process flow in the distributed data transform apparatus according to the first embodiment.

Referring to FIG. 5, an exemplary operation of distributed data transform apparatuses $20_i$ will be described in order of procedure actually performed.

At step S211, K shares $f_{sj}(i)$ (i∈λ) or K shares $f_c(i)$ output from the data distribution apparatus 10 are input into the input part 210. The shares $f_{gj}(i)$ or $f_c(i)$ may be stored in the storages 290 and the subsequent process may be performed at a given timing. Alternatively, the subsequent process may be executed immediately after the shares $f_{sj}(i)$ or $f_c(i)$ are input without storing the shares $f_{gj}(i)$ or $f_c(i)$ in the storages 290.

The K shares $f_{sj}(i)$ or K shares $f_c(i)$ are input into the reconstruction part 220. At step S220, each of the reconstruction parts 220 generates a reconstructed value from the input shares $f_{sj}(i)$ or shares $f_c(i)$. When the shares $f_{sj}(i)$ are input, the shares $f_{sj}(i)$ are reconstructed by using an arbitrary secret sharing scheme S1 to generate a value $u_j$. Then, $U_j = P(u_j)$ is calculated to obtain a reconstructed value $U_j$. The mapping $P(x)$ is the same as that in the pseudorandom number generation part 130 of the data distribution apparatus 10. Since shares of the key $s_j$ have been set in $f_{sj}(i)$ (j=1, ..., K-1) by the key division part 150 of the data distribution apparatus 10 as described above, the reconstructed value $U_j$ to which the key $s_j$ is mapped by the same mapping $P(x)$ is equal to pseudorandom number $r_j$. The secret sharing scheme S1 may be any secret sharing scheme but needs to be the same as the same secret sharing scheme S1 used by the key division part 150 of the data distribution apparatus 10.

When the shares $f_c(i)$ are input, the shares $f_c(i)$ are reconstructed by using an arbitrary secret sharing scheme S0 to generate reconstructed values $U_j$ (j=K). Since shares of the ciphertext c have been set in $f_c(i)$ by the ciphertext division part 160 of the data distribution apparatus 10 as described above, the reconstructed values $U_j$ are equal to the ciphertext c. The secret sharing scheme S0 may be any secret sharing scheme but needs to be the same as the same secret sharing scheme S0 used by the ciphertext division part 160 of the data distribution apparatus 10.

The reconstructed values $U_j$ are input into the redivision parts 230. At step S230, the redivision parts 230 divide the reconstructed values $U_j$ into N shares $f_{Uj}(n)$ (n=1, ..., N) by using an arbitrary homomorphic secret sharing scheme S2. Homomorphic means that $f_a(i) + f_b(i) = f_{a+b}(i)$ holds for shares $f_a(i), f_b(i)$ of two pieces of information a, b and for shares $f_{a+b}(i)$ of a+b. The secret sharing scheme S2 may be any secret sharing scheme that is homomorphic. For example, an existing linear secret sharing scheme such as Shamir's secret sharing scheme may be used.

Note that the process from step S211 to step S230 in FIG. 5 does not need to be performed by all of the N distributed data transform apparatuses $20_1$-$20_N$; the process has to be performed by only at least K distributed data transform apparatuses $20_1$-$20_N$ selected arbitrarily.

At step S212, K shares $f_{U1}(i), \ldots, f_{UK}(i)$ generated by the redivision parts 230 of the K distributed data transform apparatuses $20_i$(i∈λ) are input into the input parts 210. The shares $f_{U1}(i), \ldots, f_{UK}(i)$ may be stored in the storages 290 and the subsequent process may be executed at any given timing. Alternatively, the subsequent process may be executed immediately after the shares $f_{U1}(i), \ldots, f_{UK}(i)$ are input without storing the shares $f_{U1}(i), \ldots, f_{UK}(i)$ in the storages 290.

The shares $f_{U1}(i), \ldots, f_{UK}(i)$ are input into the transform parts 240. At step S240, the transform parts 240 generate shares $g_a(i)$ of the information a from the K shares $f_{U1}(i), \ldots, f_{UK}(i)$. More specifically, a share $g_a(i)$ can be the sum of the shares $f_{U1}(i), \ldots, f_{UK}(i)$ as follows:

$$g_a(i) = \sum_{k=1}^{K} f_{U_k}(i) \quad \text{[Formula 4]}$$

As has been described, $f_{UK}(i)$ is a share generated by dividing a ciphertext c by using the homomorphic secret sharing scheme S2 and $f_{U1}(i), \ldots, f_{UK-1}(i)$ are shares generated by dividing each of pseudorandom numbers $r_1, \ldots, r_{K-1}$ by using homomorphic secret sharing scheme S2. Because of the homomorphism, the sum of $f_{U1}(i), \ldots, f_{UK}(i)$ is equal to a share generated by dividing the sum of the ciphertext c and the sum of the pseudorandom numbers $r_1, \ldots, r_{K-1}$ by using the secret sharing scheme S2. Since the ciphertext c is equal to the information a minus the sum of the pseudorandom numbers $r_1, \ldots, r_{K-1}$, the share $g_a(i)$ is equal to a share generated by dividing the information a by using the secret sharing scheme S2.

At step S250, each output part 250 outputs the share $g_a(i)$. The share $g_a(i)$ may be stored in the storage 290 and may be read and output from the storage 290 in response to an external request.

Note that the process from step S212 to step S250 in FIG. 5 is performed by all of the N distributed data transform apparatuses $20_1$-$20_N$.

<Confidentiality>

Information about the information a obtained by the distributed data transform apparatuses $20_1$-$20_N$ is shares in a homomorphic secret sharing scheme S2 and the confidentiality provided by this embodiment is determined by the confidentiality provided by the homomorphic secret sharing scheme S2 used, on condition that the random numbers used for generating the shares are independent of each other. Each of the K distributed data transform apparatuses $20i$ obtains one of reconstructed values $U_j$, which are shares of the information a, but cannot obtain the information a unless all of the K reconstructed values $U_1, \ldots, U_K$ can be obtained. Therefore confidentiality provided by this embodiment is ultimately determined by the confidentiality provided by the secret sharing scheme S2 used.

Advantageous Effects

The secret sharing system according to this embodiment is capable of transforming shares $f_a(1), \ldots, f_a(N)$ of information a according to a computational secret sharing scheme to shares $g_a(1), \ldots, g_a(N)$ according to an arbitrary homomorphic secret sharing scheme S2.

Examples of homomorphic secret sharing scheme include an existing linear secret sharing scheme such as Shamir's secret sharing scheme. Since methods for performing multiparty computation using an existing linear secret sharing scheme such as Shamir's secret sharing scheme are known, multiparty computation can be performed using shares according to a computational secret sharing scheme by choosing any of existing linear secret sharing schemes, such as Shamir's secret sharing scheme, as the secret sharing scheme S2.

In the computational secret sharing scheme described in Non-patent literature 2, for example, the lower limit of the size of each share is 1K of original data. Accordingly, using the computational secret sharing scheme described in Non-patent literature 2 as the secret sharing scheme S0 for dividing a ciphertext c can reduce the storage capacity required for storing shares as compared with Shamir's secret sharing scheme in which the size of each share is substantially equal to the size of original data.

Second Embodiment

A secret sharing system according to a second embodiment of the present invention transforms shares according to a computational secret sharing scheme into shares according to any given homomorphic secret sharing scheme. While the number of keys generated is equal to the threshold for reconstruction using secret sharing schemes in the first embodiment, the number of keys does not need to be equal to the threshold for reconstruction. In the second embodiment, an example is given in which the number of keys differs from the reconstruction threshold.

<Configuration>

Figure 6:
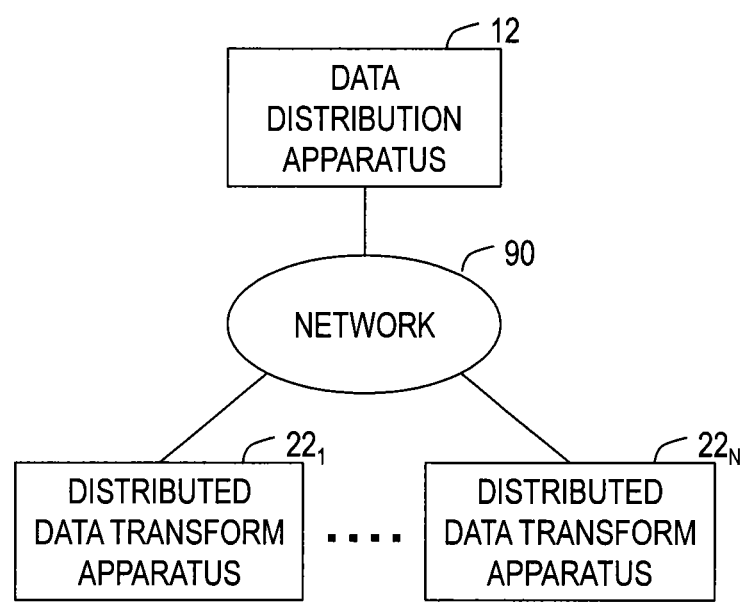
FIG. 6 is a diagram illustrating a functional configuration of a secret sharing system according to a second embodiment.

Referring to FIG. 6, an exemplary configuration of a secret sharing system 2 according to the first embodiment will be described. The secret sharing system 2 includes a data distribution apparatus 12, at least N distributed data transform apparatuses $20_1$-$20_N$, and a network 90. The data distribution apparatus 12 and the distributed data transform apparatuses $20_1$-$20_N$ are connected to the network 90. The network 90 only needs to be configured to allow the data distribution apparatus 12 and the distributed data transform apparatuses $20_1$-$20_N$ to communicate with each other and may be, for example, the Internet, a LAN, a WAN or the like. The data distribution apparatus 12 and the distributed data transform apparatuses $20_1$-$20_N$ are not necessarily able to communicate online through a network. For example, information output from the data distribution apparatus 12 may be stored on a portable recording medium such as a USB memory and may be input offline from the portable recording medium into the distributed data transform apparatuses $20_1$-$20_N$.

Figure 7:
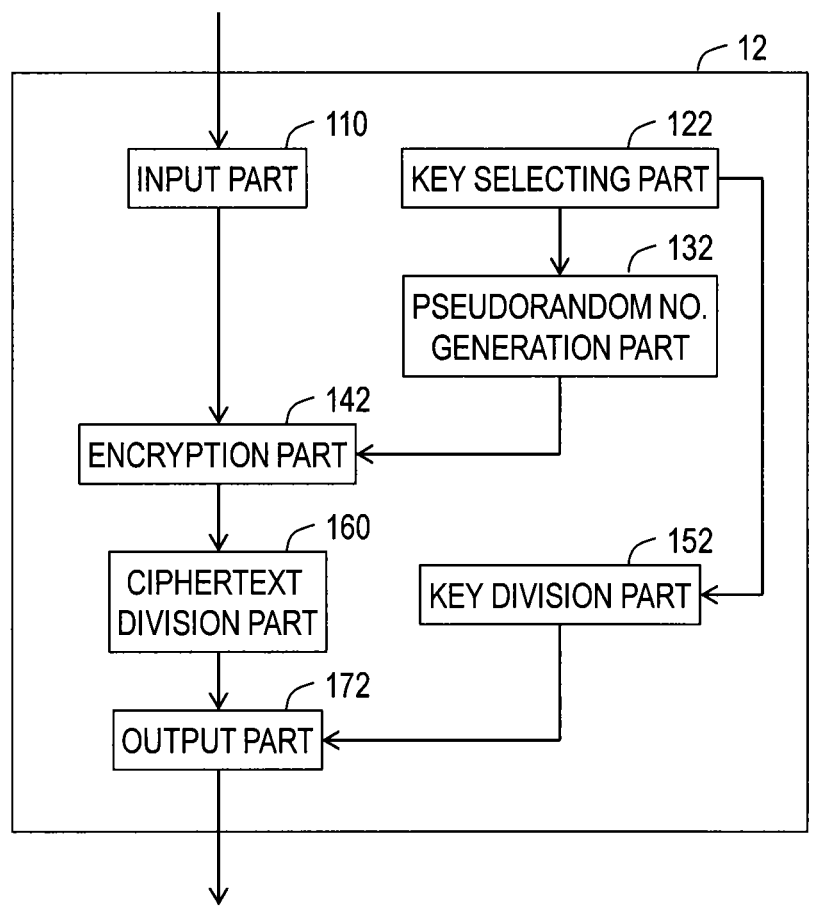
FIG. 7 is a diagram illustrating a functional configuration of a data distribution apparatus according to the second embodiment.

An exemplary configuration of the data distribution apparatus 12 included in the secret sharing system 2 will be described with reference to FIG. 7. The data distribution apparatus 12 includes an input part 110, a key selecting part 122, a pseudorandom number generation part 132, an encryption part 142, a key division part 152, a ciphertext division part 160, and an output part 172.

Figure 8:
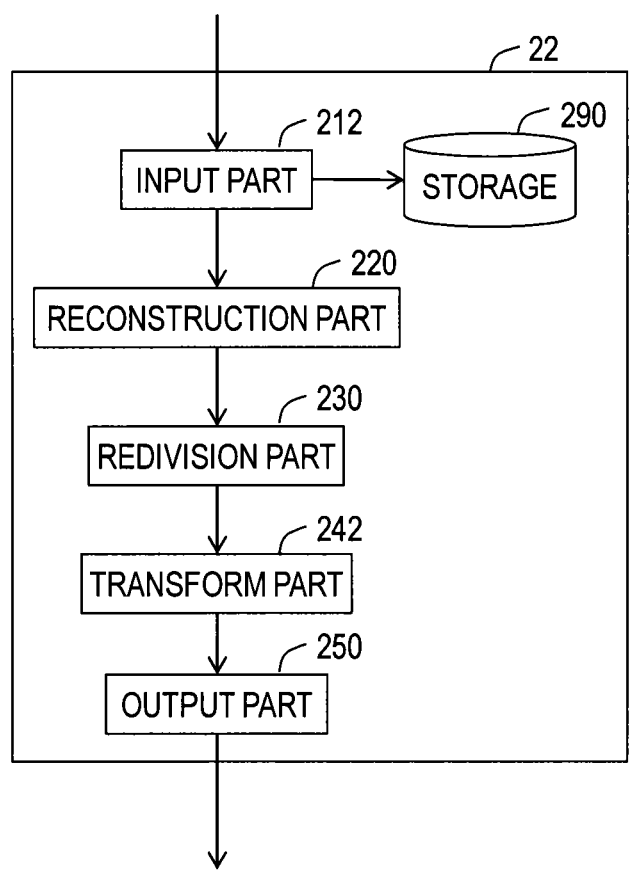
FIG. 8 is a diagram illustrating a functional configuration of a distributed data transform apparatus according to the second embodiment.

An exemplary configuration of a distributed data transform apparatus 22 included in the secret sharing system 2 will be described with reference to FIG. 8. The distributed data transform apparatus 22 includes an input part 212, a reconstruction part 220, a redivision part 230, a transform part 242, an output part 250 and a storage 290. The storage 290 may be a main memory such as a RAM (Random Access Memory), an auxiliary storage device such as a hard disk, an optical disc, or a semiconductor memory device such as a flash memory, or middleware such as a relational database or a key value store.

<Data Distribution Process>

Figure 9:
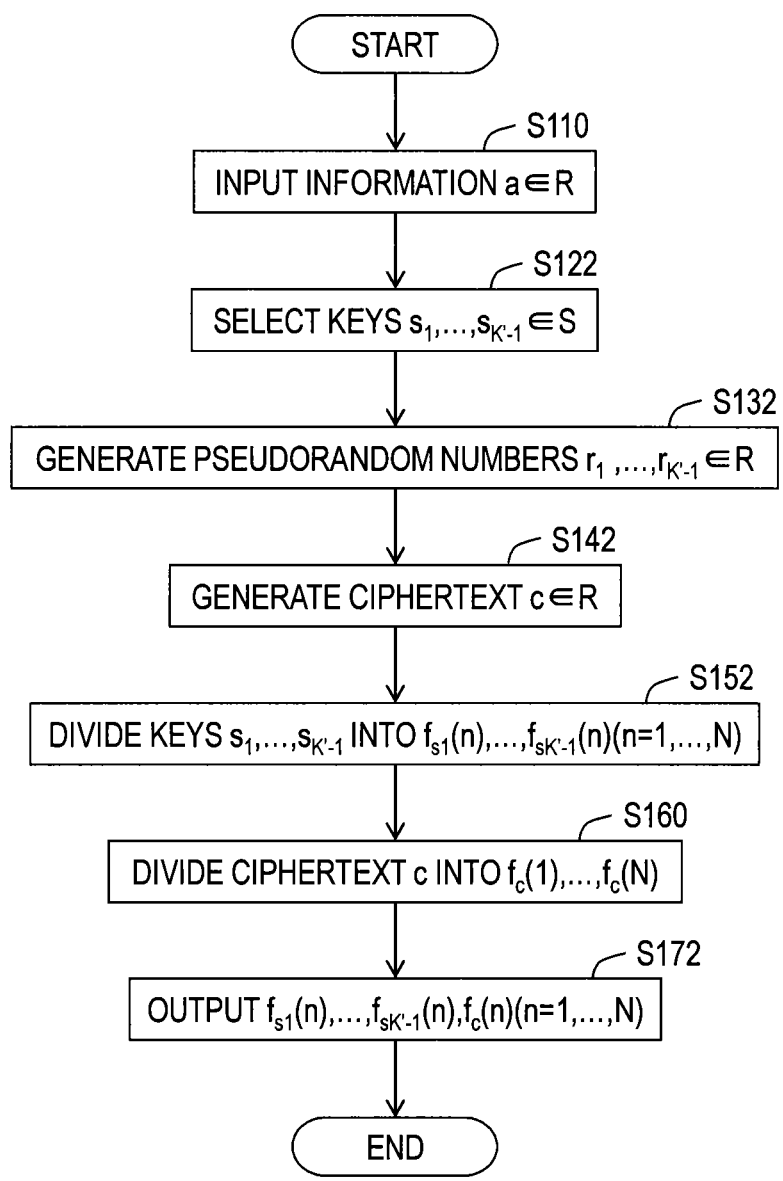
FIG. 9 is a diagram illustrating a process flow in the data distribution apparatus according to the second embodiment.

Referring to FIG. 9, an exemplary operation of the data distribution apparatus 12 will be described in order of procedure actually performed. In the following description, N, K and K' are integers greater than or equal to 2, N≥K, n=1, . . . , N, λ represents K different integers greater than or equal to 1 and less than or equal to N, i is an integer, i∈λ, $f_x(n)$ represents N shares of x, R is a ring, S is a key space, P(x) is a mapping that maps x∈S to the ring R. The mapping P(x) outputs the elements of a ring R for input x∈S. The same P(x) corresponds to the same input x. That is, the mapping P(x) is a definite mapping that outputs the same value for the same input. Input x may or may not be in one-to-one correspondence. For example, the mapping P(x) may be a pseudorandom number generator function that uses x as a seed and returns the elements of a ring R. The mapping P(x) may be a common key encryption function that outputs a ciphertext that belongs to the ring R for a fixed plaintext by using x as an encryption key. The mapping P(x) may be a function or an algorithm.

At step S110, information a is input into the input part 110. The information a is values included in the ring R. Accordingly, the information can be expressed as a∈R. Examples of the information a include a video file, an audio file, a text file, and a table file. The data amount of the information a may be greater than or equal to 1 megabytes, for example.

At step S122, the key selecting part 122 selects K'−1 keys $s_1, \ldots, s_{K'-1} \in S$. The key selecting part 120 may randomly select K'−1 keys $s_1, \ldots, s_{K'-1}$ one by one or may select K'−1 keys $s_1, \ldots, s_{K'-1}$ according to a predetermined rule from among a plurality of values generated and stored beforehand in a memory. The keys $s_1, \ldots, s_{K'-1}$ are set to a length that can ensure required safety and acceptable throughput. For example, the length is typically set to a length of 128 to 256 bits but is not limited to this range.

Keys $s_1, \ldots, s_{K'-1}$ are input into the pseudorandom number generation part 132. At step S132, the pseudorandom number generation part 132 computes $r_j = P(s_j)$ (j=1, . . . , K'−1) from the key $s_1, \ldots, s_{K'-1}$ to generate pseudorandom numbers $r_1, \ldots, r_{K'-1}$.

The information a and the pseudorandom numbers $r_1, \ldots, r_{K'-1}$ are input into the encryption part 142. At step S142, the encryption part 142 uses the random numbers $r_1, \ldots, r_{K'-1}$ to generate a ciphertext c from the information a. More specifically, the ciphertext c is equal to the information a minus the sum of the pseudorandom numbers $r_1, \ldots, r_{K'-1}$ as follows:

$$c = a - \Sigma_{k=1}^{K'-1} r_k \qquad \text{[Formula 5]}$$

Keys $s_1, \ldots, s_{K'-1}$ are also input into the key distribution part 152. At step S152, the key division part 150 divides each of the keys $s_1, \ldots, s_{K'-1}$ into N shares $f_{s1}(n), \ldots, f_{sK'-1}(n)$ (n=1, . . . , N) according to an arbitrary secret sharing scheme S1. While the secret sharing scheme S1 may be any secret sharing scheme, it is desirable to use a secure secret sharing scheme because the keys used for decrypting the information a is distributed. For example, Shamir's secret sharing scheme can be used. Shamir's secret sharing scheme is a secure secret sharing scheme because original data can be reconstructed from K or more shares among N shares into which the original data has been divided but no information about the original data can be obtained from fewer than K shares, where N and K are integers greater than or equal to 2 and N≥K.

The ciphertext c is input into the ciphertext division part 160. At step S160, the ciphertext division part 160 divides the ciphertext c into N shares $f_c(n)$ (n=1, . . . , N) according to an arbitrary secret sharing scheme S0. The secret sharing scheme S0 may be any secret sharing method and may be a sharing scheme, called an information dispersal algorithm (IDA), that does not take secrecy into consideration. The sharing scheme S0 may be the scheme described in Non-patent literature 2, for example. However, when the scheme described in Non-patent literature 2 is used, a value c on the ring R needs to be transformed to a K-dimensional vector on GF(p). This can be achieved, for example, by padding higher-order bits with 0s so that the elements of the ring R have a length of K×L bits, where the bit length of a prime P is L+1 and the bit length of elements of the ring R is less than or equal to K×L, dividing value c into L-bit values and setting the L-bit values as the elements of GF(p), where each of the L-bit divided values is an integer greater than or equal to 0 and less than $2^L$.

At step S172, the output part 172 outputs shares $f_{s1}(n), \ldots, f_{sK'-1}(n), f_c(n)$ (n=1, . . . , N). The output shares $f_{s1}(n), \ldots, f_{sK'-1}(n), f_c(n)$ (n=1, . . . , N) are input into distributed data transform apparatuses $20_1$-$20_N$, respectively, through the network 90 or a portable recording medium such as a USB memory.

<Distributed Data Transform Process>

Figure 10:
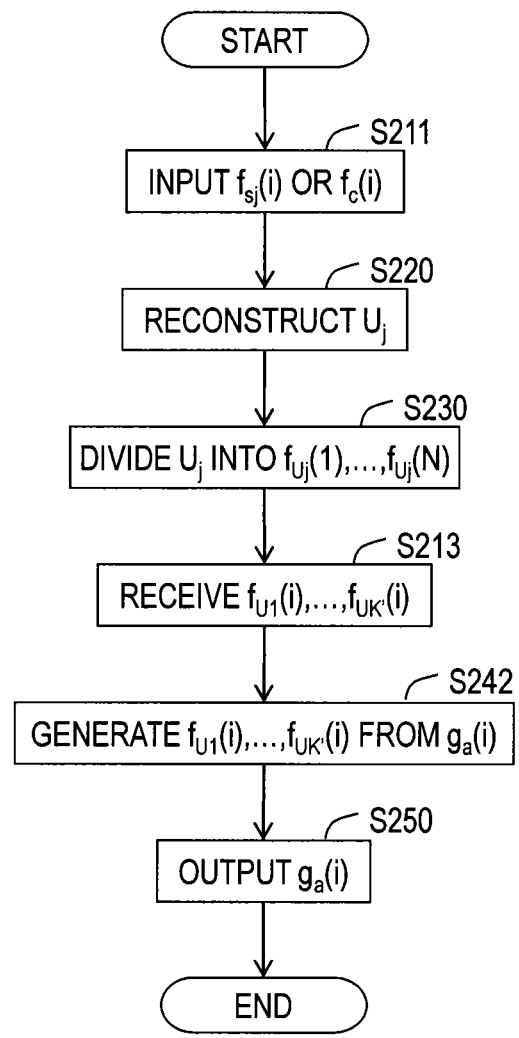
FIG. 10 is a diagram illustrating a process flow in the distributed data transform apparatus according to the second embodiment.

Referring to FIG. 10, an exemplary operation of distributed data transform apparatuses $22_i$ will be described in order of procedure actually performed.

At step S211, K shares $f_{sj}(i)$ (i∈λ) or K shares $f_c(i)$ output from the data distribution apparatus 12 are input into the input part 212. The shares $f_{gj}(i)$ or $f_c(i)$ may be stored in the storages 290 and the subsequent process may be performed at a given timing. Alternatively, the subsequent process may be executed immediately after the shares $f_{sj}(i)$ or $f_c(i)$ are input without storing the shares $f_{sj}(i)$ or $f_c(i)$ in the storages 290.

The K shares $f_{sj}(i)$ or K shares $f_c(i)$ are input into the reconstruction part 220. At step S220, each of the reconstruction parts 220 generates a reconstructed value $U_j$ from the input shares $f_{sj}(i)$ or shares $f_c(i)$. When the shares $f_{sj}(i)$ are input, the shares $f_{sj}(i)$ are reconstructed using an arbitrary secret sharing scheme S1 to generate a value $u_j$. Then, $U_j$=P($u_j$) is calculated to obtain a reconstructed value $U_j$. The mapping P(x) is the same as that in the pseudorandom number generation part 130 of the data distribution apparatus 12. Since shares of the key $s_j$ have been set in $f_{sj}(i)$ (j=1, . . . , K'-1) by the key division part 150 of the data distribution apparatus 12 as described above, the reconstructed value $U_j$ to which the key $s_j$ is mapped by the same mapping is equal to pseudorandom number $r_j$. The secret sharing scheme S1 needs to be the same as the same secret sharing scheme S1 used by the key division part 150 of the data distribution apparatus 12.

When the shares $f_c(i)$ are input, the shares $f_c(i)$ are reconstructed by using an arbitrary secret sharing scheme S0 to generate reconstructed values $U_j$ (j=K'). Since shares of the ciphertext c have been set in $f_c(i)$ by the ciphertext division part 160 of the data distribution apparatus 12 as described above, the reconstructed values $U_j$ (j=K') are equal to the ciphertext c. The sharing scheme S0 needs to be the same as the same secret sharing scheme S0 used by the ciphertext division part 160 of the data distribution apparatus 12.

The reconstructed values $U_j$ are input into the redivision parts 230. At step S230, the redivision parts 230 divide the reconstructed values $U_j$ into N shares $f_{Uj}(n)$ (n=1, . . . , N) by using an arbitrary homomorphic secret sharing scheme S2. Homomorphic means that $f_a(i)+f_b(i)=f_{a+b}(i)$ holds for shares $f_a(i)$, $f_b(i)$ of two pieces of information a, b and for shares $f_{a+b}(i)$ of a+b. The secret sharing scheme S2 may be any secret sharing scheme that is homomorphic. For example, an existing linear secret sharing scheme such as Shamir's secret sharing scheme may be used.

Note that the process from step S211 to step S230 in FIG. 10 does not need to be performed by all of the N distributed data transform apparatuses $20_1$-$20_N$; the process has to be performed by only at least K distributed data transform apparatuses $20_1$-$20_N$ selected arbitrarily.

At step S213, K' shares $f_{U1}(i), \ldots, f_{UK'}(i)$ generated by the redivision parts 230 of the K' distributed data transform apparatuses $20_i$ (i∈λ) are input into the input parts 212. The shares $f_{U1}(i), \ldots, f_{UK'}(i)$ may be stored in the storages 290 and the subsequent process may be executed at any given timing. Alternatively, the subsequent process may be executed immediately after the shares $f_{U1}(i), \ldots, f_{UK'}(i)$ are input without storing the shares $f_{U1}(i), \ldots, f_{UK'}(i)$ in the storages 290.

The shares $f_{U1}(i), \ldots, f_{UK'}(i)$ are input into the transform parts 242. At step S242, the transform parts 242 generate shares $g_a(i)$ of the information a from the K' shares $f_{U1}(i), \ldots, f_{UK'}(i)$. More specifically, a share $g_a(i)$ can be the sum of the shares $f_{U1}(i), \ldots, f_{UK'}(i)$ as follows:

$$g_a(i) = \Sigma_{k=1}^{K'} f_{U_k}(i) \qquad \text{[Formula 6]}$$

As has been described, $f_{UK'}(i)$ is a share generated by dividing a ciphertext c by using the homomorphic secret sharing scheme S2 and $f_{U1}(i), \ldots, f_{UK'-1}(i)$ are shares generated by dividing each of pseudorandom numbers $r_1, \ldots, r_{K'-1}$ by using the homomorphic secret sharing scheme S2. Because of the homomorphism, the sum of $F_{U1}(i), \ldots, f_{UK'}(i)$ is equal to a share generated by dividing the sum of the ciphertext c and the sum of the pseudorandom numbers $r_1, \ldots, r_{K'-1}$ by using the secret sharing scheme S2. Since the ciphertext c is equal to the information a minus the sum of the pseudorandom numbers $r_1, \ldots, r_{K'-1}$ the share $g_a(i)$ is equal to a share generated by dividing the information a by using the secret sharing scheme S2.

At step S250, each output part 250 outputs the share $g_a(i)$. The share $g_a(i)$ may be stored in the storage 290 and may be read and output from the storage 290 in response to an external request.

Note that the process from step S213 to step S250 in FIG. 10 is performed by all of the N distributed data transform apparatuses $22_1$-$22_N$.

<Confidentiality>

Information about the information a obtained by the distributed data transform apparatuses $22_1$-$22_N$ is shares in a homomorphic secret sharing scheme S2 and the confidentiality provided by this embodiment is determined by the confidentiality provided by the homomorphic secret sharing scheme S2 used, on condition that the random numbers used for generating the shares are independent of each other. Each of the K' distributed data transform apparatuses 22i obtains one of reconstructed values $U_j$, which are shares of the information a, but cannot obtain the information a unless all of the K' reconstructed values $U_1, \ldots, U_{K'}$ can be obtained. However, secrecy cannot be ensured for $U_{K'}$ because sharing has been performed using an arbitrary sharing scheme. Confidentiality provided by this embodiment is ultimately determined by the confidentiality provided by the secret sharing scheme S2 used when K'>K.

Advantageous Effects

The secret sharing system according to this embodiment is capable of transforming shares $f_a(1), \ldots, f_a(N)$ of information a according to a computational secret sharing scheme to shares $g_a(1), \ldots, g_a(N)$ according to an arbitrary homomorphic secret sharing scheme S2.

Examples of the homomorphic secret sharing scheme include an existing linear secret sharing scheme such as Shamir's secret sharing scheme. Since methods for performing multiparty computation using an existing linear secret sharing scheme such as Shamir's secret sharing scheme are known, multiparty computation can be performed using shares according to a computational secret sharing scheme by choosing any of existing linear secret sharing schemes, such as Shamir's secret sharing scheme, as the secret sharing scheme S2.

In the computational secret sharing scheme described in Non-patent literature 2, for example, the lower limit of the size of each share is 1/K of original data. Accordingly, using the computational secret sharing scheme described in Non-patent literature 2 as the sharing scheme S0 for dividing a ciphertext c can reduce the storage capacity required for storing shares as compared with Shamir's secret sharing scheme in which the size of each share is substantially equal to the size of original data.

[Program and Recording Medium]

The present invention is not limited to the embodiments described above; various modifications can be made as appropriate without departing from the spirit of the present invention. The processes described in the embodiments may be performed not only in time sequence as is written or may be performed in parallel with one another or individually, depending on the throughput of the apparatuses that perform the processes or requirements.

If processing functions of any of the apparatuses described in the embodiments are implemented by a computer, the processing of the functions that the apparatuses should include is described in a program. The program is executed on the computer to implement the processing functions of the apparatus on the computer.

The programs describing the processing can be recorded on a computer-readable recording medium. The computer-readable recording medium may be any recording medium such as a magnetic recording device, an optical disc, a magneto-optical recording medium, and a semiconductor memory.

The program is distributed by selling, transferring, or lending a portable recording medium on which the program is recorded, such as a DVD or a CD-ROM. The program may be stored on a storage device of a server computer and transferred from the server computer to other computers over a network, thereby distributing the program.

A computer that executes the program first stores the program recorded on a portable recording medium or transferred from a server computer into a storage device of the computer. When the computer executes the processes, the computer reads the program stored on the recording medium of the computer and executes the processes according to the read program. In another mode of execution of the program, the computer may read the program directly from a portable recording medium and execute the processes according to the program or may execute the processes according to the program each time the program is transferred from the server computer to the computer. Alternatively, the processes may be executed using a so-called ASP (Application Service Provider) service in which the program is not transferred from a server computer to the computer but process functions are implemented by instructions to execute the program and acquisition of the results of the execution. Note that the program in this mode encompasses information that is provided for processing by an electronic computer and is equivalent to the program (such as data that is not direct commands to a computer but has the nature that defines processing of the computer).

While the apparatuses are configured by causing a computer to execute a predetermined program in the embodiments described above, at least some of the processes may be implemented by hardware.

What is claimed is:

1. A secret sharing system comprising a data distribution apparatus and N distributed data transform apparatuses,
   the data distribution apparatus comprising:
   circuitry configured to
     receive an electronic information file a as an input;
     select K−1 keys $s_1, \ldots, s_{K-1} \in S$;
     compute $r_j = P(s_j)$ from the keys $s_1, \ldots, s_{K-1}$ to generate pseudorandom numbers $r_1, \ldots, r_{K-1}$, where j=1, ..., K−1;
     generate a ciphertext c from the electronic information file $a \in R$ by using the pseudorandom numbers $r_1, \ldots, r_{K-1}$;
     divide each of the keys $s_1, \ldots, s_{K-1}$ into N shares $f_{s1}(n), \ldots, f_{sK-1}(n)$ by using an arbitrary secret sharing scheme S1; and
     divide the ciphertext c into N shares $f_c(n)$ by using an arbitrary secret sharing scheme S0;
   each of the distributed data transform apparatuses comprising:
   circuitry configured to
     compute a reconstructed value $U_j = P(u_j)$ from a value $u_j$ generated by reconstruction of shares $f_{sj}(i)$ by using the secret sharing scheme S1 when K shares $f_{sj}(i)$ are input into the distributed data transform apparatuses, and generate the reconstructed value $U_j$ (j=K) by reconstruction of shares $f_c(i)$ by using the secret sharing scheme S0 when K shares $f_c(i)$ are input into the distributed data transform apparatuses;
     divide the reconstructed value $U_j$ into N shares $f_{Uj}(n)$ by using an arbitrary homomorphic secret sharing scheme S2; and
     generate a share $g_a(i)$ of the electronic information file a from K shares $f_{U1}(i), \ldots, f_{UK}(i)$;
   where N and K are integers greater than or equal to 2, N≥K, n=1, ..., N, λ represents K different integers greater than or equal to 1 and less than or equal to N, i is an integer, i∈λ, $f_x(n)$ represents N shares of x, R is a ring, S is a key space, and P(x) is a mapping that maps x∈S to the ring R,
   wherein at least K distributed data transform apparatuses are configured to reproduce the original electronic information file a when at least K reconstructed values $U_j$ are reconstructed separately respectively by the at least K distributed data transform apparatuses, and none of the original electronic information file a can be obtained when less than K reconstructed values $U_j$ are reconstructed by less than K distributed data transform apparatuses.

2. A secret sharing system comprising a data distribution apparatus and N distributed data transform apparatuses,
   the data distribution apparatus comprising:
   circuitry configured to
     receive an electronic information file a as an input;
     select K′−1 keys $s_1, \ldots, s_{K'-1} \in S$;
     compute $r_j = P(s_j)$ from the keys $s_1, \ldots, s_{K'-1}$ to generate pseudorandom numbers $r_1, \ldots, r_{K'-1}$, where j=1, ..., K′−1;

generate a ciphertext c from the electronic information file a∈R by using the pseudorandom numbers $r_1, \ldots, r_{K'-1}$;

divide each of the keys $s_1, \ldots, s_{K'-1}$ into N shares $f_{s1}(n), \ldots, f_{sK'-1}(n)$ by using an arbitrary secret sharing scheme S1; and divide the ciphertext c into N shares $f_c(n)$ by using an arbitrary sharing scheme S0;

each of the distributed data transform apparatuses comprising:

circuitry configured to compute a reconstructed value $U_j=P(u_j)$ from a value $u_j$ generated by reconstruction of shares $f_{sj}(i)$ by using the secret sharing scheme S1 when K shares $f_{sj}(i)$ are input into the distributed data transform apparatuses, and generate the reconstructed value $U_j$ (j=K') by reconstruction of shares $f_c(i)$ by using the secret sharing scheme S0 when K shares $f_c(i)$ are input into the distributed data transform apparatuses;

divide the reconstructed value $U_j$ into N shares $f_{Uj}(n)$ by using an arbitrary homomorphic secret sharing scheme S2; and generate a share $g_a(i)$ of the electronic information file a from K' shares $f_{U1}(i), \ldots, f_{UK'}(i)$;

where N, K and K' are integers greater than or equal to 2, N≥K, n=1, . . . , N, λ represents K different integers greater than or equal to 1 and less than or equal to N, i is an integer, i∈λ, $f_x(n)$ represents N shares of x, R is a ring, S is a key space, and P(x) is a mapping that maps x∈S to the ring R, wherein at least K' distributed data transform apparatuses are configured to reproduce the original electronic information file a, when at least K' reconstructed values $U_j$ are reconstructed separately respectively by the at least K' distributed data transform apparatuses, and none of the original electronic information file a can be obtained when less than K' reconstructed values $U_j$ are reconstructed by less than K' distributed data transform apparatuses.

3. The secret sharing system according to claim 2, wherein the circuitry of the data distribution apparatus subtracts the sum of the pseudorandom numbers $r_1, \ldots, r_{K'-1}$ from the electronic information file a to generate the ciphertext c; and the circuitry of each of the distributed data transform apparatuses generates the sum of the shares $f_{U1}(i), \ldots, f_{UK'}(i)$ as the share $g_a(i)$.

4. The secret sharing system according to claim 2, wherein the secret sharing scheme S2 is Shamir's secret sharing scheme.

5. The secret sharing system according to claim 3, wherein the secret sharing scheme S2 is Shamir's secret sharing scheme.

6. The secret sharing system according to claim 1, wherein the circuitry of the data distribution apparatus subtracts the sum of the pseudorandom numbers $r_1, \ldots, r_{K-1}$ from the electronic information file a to generate the ciphertext c; and the circuitry of each of the distributed data transform apparatuses generates the sum of the shares $f_{U1}(i), \ldots, f_{UK}(i)$ as the share $g_a(i)$.

7. The secret sharing system according to claim 6, wherein the secret sharing scheme S2 is Shamir's secret sharing scheme.

8. The secret sharing system according to claim 1, wherein the secret sharing scheme S2 is Shamir's secret sharing scheme.

9. A data distribution apparatus included in the secret sharing system according to claim 1, the circuitry of the data distribution apparatus being further configured to:

select K−1 keys $s_1, \ldots, s_{K-1}$∈S;

compute $r_j=P(s_j)$ from the keys $s_1, \ldots, s_{K-1}$ to generate pseudorandom numbers $r_1, \ldots, r_{K-1}$, where j=1, . . . , K−1;

generate a ciphertext c from the electronic information file a∈R by using the pseudorandom numbers $r_1, \ldots, r_{K-1}$;

divide each of the keys $s_1, \ldots, s_{K-1}$ into N shares $f_{s1}(n), \ldots, f_{sK-1}(n)$ by using an arbitrary secret sharing scheme S1; and divide the ciphertext c into N shares $f_c(n)$ by using an arbitrary secret sharing scheme S0;

where N and K are integers greater than or equal to 2, N≥K, n=1, . . . , N, λ represents K different integers greater than or equal to 1 and less than or equal to N, i is an integer, i∈λ, $f_x(n)$ represents N shares of x, R is a ring, S is a key space, and P(x) is a mapping that maps x∈S to the ring R.

10. A data distribution apparatus included in the secret sharing system according to claim 2, wherein the circuitry of the data distribution apparatus is further configured to:

select K'−1 keys $s_1, \ldots, s_{K'-1}$∈S;

compute $r_j=P(s_j)$ from the keys $s_1, \ldots, s_{K'-1}$ to generate pseudorandom numbers $r_1, \ldots, r_{K'-1}$, where j=1, . . . , K'−1;

generate a ciphertext c from the electronic information file a∈R by using the pseudorandom numbers $r_1, \ldots, r_{K'-1}$;

divide each of the keys $s_1, \ldots, s_{K'-1}$ into N shares $f_{s1}(n), \ldots, f_{sK'-1}(n)$ by using an arbitrary secret sharing scheme S1; and divide the ciphertext c into N shares $f_c(n)$ by using an arbitrary sharing scheme S0;

where N K and K' are integers greater than or equal to 2, N≥K, n=1, . . . , N, λ represents K different integers greater than or equal to 1 and less than or equal to N, i is an integer, i∈λ, $f_x(n)$ represents N shares of x, R is a ring, S is a key space, and P(x) is a mapping that maps x∈S to the ring R.

11. A distributed data transform apparatus, in a secret sharing system comprising a data distribution apparatus and N distributed data transform apparatuses, wherein the data distribution apparatus receives an electronic information file a as an input selects K−1 keys $s_1, \ldots, s_{K-1}$∈S; computes $r_j=P(s_j)$ from the keys $s_1, \ldots, s_{K-1}$ to generate pseudorandom numbers $r_1, \ldots, r_{K-1}$, where j=1, . . . , K−1; generates a ciphertext c from the electronic information file a∈R by using the pseudorandom numbers $r_1, \ldots, r_{K-1}$; divides each of the keys $s_1, \ldots, s_{K-1}$ into N shares $f_{s1}(n), \ldots, f_{sK-1}(n)$ by using an arbitrary secret sharing scheme S1; and divides the ciphertext c into N shares $f_c(n)$ by using an arbitrary secret sharing scheme S0, the distributed data transform apparatus comprising:

circuitry configured to compute a reconstructed value $U_j=P(u_j)$ from a value $u_j$ generated by reconstruction of shares $f_{sj}(i)$ by using the secret sharing scheme S1 when K shares $f_{sj}(i)$ are input, and generate the reconstructed value $U_j$ (j=K) by reconstruction of shares $f_c(i)$ by using the secret sharing scheme S0 when K shares $f_c(i)$ are input;

divide the reconstructed value $U_j$ into N shares $f_{Uj}(n)$ by using an arbitrary homomorphic secret sharing scheme S2; and generate a share $g_a(i)$ of the electronic information file a from K shares $f_{U1}(i), \ldots, f_{UK}(i)$; and where N and K are integers greater than or equal to 2, N≥K, n=1, ..., N, λ represents K different integers greater than or equal to 1 and less than or equal to N, i is an integer, i∈λ, $f_x(n)$ represents N shares of x, R is a ring, S is a key space, and P(x) is a mapping that maps x∈S to the ring R, wherein at least K distributed data transform apparatuses of the N distributed data transform apparatuses are configured to reproduce the original electronic information file a, when at least K reconstructed values $U_j$ are reconstructed separately respectively by the at least K distributed data transform apparatuses, and none of the original electronic information file a can be obtained when less than K reconstructed values $U_j$ are reconstructed by less than K distributed data transform apparatuses.

12. A distributed data transform apparatus, in a secret sharing system comprising a data distribution apparatus and N distributed data transform apparatuses, wherein the data distribution apparatus receives an electronic information file a as an input, selects K'−1 keys $s_1, ..., s_{K'-1} \in S$, computes $r_j = P(s_j)$ from the keys $s_1, ..., s_{K'-1}$ to generate pseudorandom numbers $r_1, ..., r_{K'-1}$, where j=1, ..., K'−1; generates a ciphertext c from information a∈R by using the pseudorandom numbers $r_1, ..., r_{K'-1}$, divides each of the keys $s_1, ..., s_{K'-1}$ into N shares $f_{s1}(n), ..., f_{sK'-1}(n)$ by using an arbitrary secret sharing scheme S1, and divides the ciphertext c into N shares $f_c(n)$ by using an arbitrary sharing scheme S0, the distributed data transform apparatus comprising:

circuitry configured to compute a reconstructed value $U_j = P(u_j)$ from a value $u_j$ generated by reconstructing of shares $f_{sj}(i)$ by using the secret sharing scheme S1 when K shares $f_{sj}(i)$ are input, and generate the reconstructed value $U_j$ (j=K') by reconstruction of shares $f_c(i)$ by using the secret sharing scheme S0 when K shares $f_c(i)$ are input;

divide the reconstructed value $U_j$ into N shares $f_{Uj}(n)$ by using an arbitrary homomorphic secret sharing scheme S2; and generate a share $g_a(i)$ of the electronic information file a from K' shares $f_{U1}(i), ..., f_{UK'}(i)$;

where N, K and K' are integers greater than or equal to 2, N≥K, n=1, ..., N, λ represents K different integers greater than or equal to 1 and less than or equal to N, i is an integer, i∈λ, $f_x(n)$ represents N shares of x, R is a ring, S is a key space, and P(x) is a mapping that maps x∈S to the ring R, wherein at least K' distributed data transform apparatuses are configured to reproduce the original electronic information file a, when at least K' reconstructed values $U_j$ are reconstructed separately respectively by the at least K' distributed data transform apparatuses, and none of the original electronic information file a can be obtained when less than K' reconstructed values $U_j$ are reconstructed by less than K' distributed data transform apparatuses.

13. A secret sharing method, implemented by a secret sharing system comprising a data distribution apparatus and N distributed data transform apparatuses, comprising:

by circuitry of the data distribution apparatus:

receiving an electronic information file a as an input;

selecting K−1 keys $s_1 ..., s_{K-1} \in S$, computing $r_j = P(s_j)$ from the keys $s_1, ..., s_{K-1}$ to generate pseudorandom numbers $r_1, ..., r_{K-1}$, where j=1, ..., K−1, generating a ciphertext c from the electronic information file a∈R by using the pseudorandom numbers $r_1, ..., r_{K-1}$, dividing each of the keys $s_1, ..., s_{K-1}$ into N shares $f_{s1}(n), ..., f_{sK-1}(n)$ by using an arbitrary secret sharing scheme S1, and dividing the ciphertext c into N shares $f_c(n)$ by using an arbitrary secret sharing scheme S0; and by circuitry of each of the distributed data transform apparatuses:

computing a reconstructed value $U_j = P(u_j)$ from a value $u_j$ generated by reconstruction of shares $f_{sj}(i)$ by using the secret sharing scheme S1 when K shares $f_{sj}(i)$ are input into the distributed data transform apparatuses, and generate the reconstructed value $U_j$ (j=K) by reconstruction of shares $f_c(i)$ by using the secret sharing scheme S0 when K shares $f_c(i)$ are input into the distributed data transform apparatuses;

dividing the reconstructed value $U_j$ into N shares $f_{Uj}(n)$ by using an arbitrary homomorphic secret sharing scheme S2; and generating a share $g_a(i)$ of the electronic information file a from K shares $f_{U1}(i), ..., f_{UK}(i)$;

where N and K are integers greater than or equal to 2, N≥K, n=1, ..., N, λ represents K different integers greater than or equal to 1 and less than or equal to N, i is an integer, i∈λ, $f_x(n)$ represents N shares of x, R is a ring, S is a key space, and P(x) is a mapping that maps x∈S to the ring R, and wherein at least K distributed data transform apparatuses are configured to reproduce the original electronic information file a, when at least K reconstructed values $U_j$ are reconstructed separately respectively by the at least K distributed data transform apparatuses, and none of the original electronic information file a can be obtained when less than K reconstructed values $U_j$ are reconstructed by less than K distributed data transform apparatuses.

14. A secret sharing method, implemented by a secret sharing system comprising a data distribution apparatus and N distributed data transform apparatuses, comprising:

by circuitry of the data distribution apparatus:

receiving an electronic information file a as an input;

selecting K'−1 keys $s_1, ..., s_{K'-1} \in S$;

computing $r_j = P(s_j)$ from the keys $s_1, ..., s_{K'-1}$ to generate pseudorandom numbers $r_1, ..., r_{K'-1}$, where j=1, ..., K'−1;

generating a ciphertext c from the electronic information file a∈R by using the pseudorandom numbers $r_1, ..., r_{K'-1}$;

dividing each of the keys $s_1, ..., s_{K'-1}$ into N shares $f_{s1}(n), ..., f_{sK'-1}(n)$ by using an arbitrary secret sharing scheme S1; and dividing the ciphertext c into N shares $f_c(n)$ by using an arbitrary sharing scheme S0;

by circuitry of each of the distributed data transform apparatuses:

computing a reconstructed value $U_j = P(u_j)$ from a value $u_j$ generated by reconstruction of shares $f_{sj}(i)$ by using the secret sharing scheme S1 when K shares $f_{sj}(i)$ are input into the distributed data transform apparatuses, and generate the reconstructed value $U_j$ (j=K') by reconstruction of shares $f_c(i)$ by using the secret sharing scheme S0 when K shares $f_c(i)$ are input into the distributed data transform apparatuses;

dividing the reconstructed value $U_j$ into N shares $f_{Uj}(n)$ by using an arbitrary homomorphic secret sharing scheme S2, and generating a share $g_a(i)$ of the electronic information file a from K' shares $f_{U1}(i), \ldots, f_{UK'}(i)$;

where N, K and K' are integers greater than or equal to 2, N≥K, n=1, ..., N, λ represents K different integers greater than or equal to 1 and less than or equal to N, i is an integer, i∈λ, $f_x(n)$ represents N shares of x, R is a ring, S is a key space, and P(x) is a mapping that maps x∈S to the ring R, wherein at least K' distributed data transform apparatuses are configured to reproduce the original electronic information file a, when at least K' reconstructed values $U_j$ are reconstructed separately respectively by the at least K' distributed data transform apparatuses, and none of the original electronic information file a can be obtained when less than K' reconstructed values $U_j$ are reconstructed by less than K' distributed data transform apparatuses.

15. A non-transitory computer readable medium including computer executable instructions that make a data distribution apparatus, in a secret sharing system comprising a data distribution apparatus and N distributed data transform apparatuses, wherein the data distribution apparatus receives an electronic information file a as an input; selects K−1 keys $s_1, \ldots, s_{K-1} \in S$; computes $r_j=P(s_j)$ from the keys $s_1, \ldots, s_{K-1}$ to generate pseudorandom numbers $r_1, \ldots, r_{K-1}$, where j=1, ..., K−1; generates a ciphertext c from the electronic information file a∈R by using the pseudorandom numbers $r_1, \ldots, r_{K-1}$; divides each of the keys $s_1, \ldots, s_{K-1}$ into N shares $f_{s1}(n), \ldots, f_{sK-1}(n)$ by using an arbitrary secret sharing scheme S1, and divides the ciphertext c into N shares $f_c(n)$ by using an arbitrary secret sharing scheme S0, perform a method comprising:

computing a reconstructed value $U_j=P(u_j)$ from a value $u_j$ generated by reconstruction of shares $f_{sj}(i)$ by using the secret sharing scheme S1 when K shares $f_{sj}(i)$ are input, and generate the reconstructed value $U_j$ (j=K) by reconstruction of shares $f_c(i)$ by using the secret sharing scheme S0 when K shares $f_c(i)$ are input;

dividing the reconstructed value $U_j$ into N shares $f_{Uj}(n)$ by using an arbitrary homomorphic secret sharing scheme S2; and generating a share $g_a(i)$ of the electronic information file a from K shares $f_{U1}(i), \ldots, f_{UK}(i)$; and where N and K are integers greater than or equal to 2, N≥K, n=1, ..., N, λ represents K different integers greater than or equal to 1 and less than or equal to N, i is an integer, i∈λ, $f_x(n)$ represents N shares of x, R is a ring, S is a key space, and P(x) is a mapping that maps x∈S to the ring R, wherein at least K distributed data transform apparatuses of the N distributed data transform apparatuses are configured to reproduce the original electronic information file a, when at least K reconstructed values $U_j$ are reconstructed separately respectively by the at least K distributed data transform apparatuses, and none of the original electronic information file a can be obtained when less than K reconstructed values $U_j$ are reconstructed by less than K distributed data transform apparatuses.

16. A non-transitory computer readable medium including computer executable instructions that make a distributed data transform apparatus in a secret sharing system comprising a data distribution apparatus and N distributed data transform apparatuses, wherein the data distribution apparatus receives an electronic information file a as an input, selects K'−1 keys $s_1, \ldots, s_{K'-1} \in S$, computes $r_j=P(s_j)$ from the keys $s_1, \ldots, s_{K'-1}$ to generate pseudorandom numbers $r_1, \ldots, r_{K'-1}$, where j=1, ..., K'−1; generates a ciphertext c from the electronic information file a∈R by using the pseudorandom numbers $r_1, \ldots, r_{K'-1}$, divides each of the keys $s_1, \ldots, s_{K'-1}$ into N shares $f_{s1}(n), \ldots, f_{sK'-1}(n)$ by using an arbitrary secret sharing scheme S1, and divides the ciphertext c into N shares $f_c(n)$ by using an arbitrary sharing scheme S0, perform a method comprising:

computing a reconstructed value $U_j=P(u_j)$ from a value $u_j$ generated by reconstructing of shares $f_{sj}(i)$ by using the secret sharing scheme S1 when K shares $f_{sj}(i)$ are input, and generate the reconstructed value $U_j$ (j=K') by reconstruction of shares $f_c(i)$ by using the secret sharing scheme S0 when K shares $f_c(i)$ are input;

dividing the reconstructed value $U_j$ into N shares $f_{Uj}(n)$ by using an arbitrary homomorphic secret sharing scheme S2; and generating a share $g_a(i)$ of the electronic information file a from K' shares $f_{U1}(i), \ldots, f_{UK'}(i)$;

where N, K and K' are integers greater than or equal to 2, N≥K, n=1, ..., N, λ represents K different integers greater than or equal to 1 and less than or equal to N, i is an integer, i∈λ, $f_x(n)$ represents N shares of x, R is a ring, S is a key space, and P(x) is a mapping that maps x∈S to the ring R, wherein at least K' distributed data transform apparatuses are configured to reproduce the original electronic information file a, when at least K' reconstructed values $U_j$ are reconstructed separately respectively by the at least K' distributed data transform apparatuses, and none of the original electronic information file a can be obtained when less than K' reconstructed values $U_j$ are reconstructed by less than K' distributed data transform apparatuses.

* * * * *